US010531286B2

(12) United States Patent
Livneh

(10) Patent No.: US 10,531,286 B2
(45) Date of Patent: Jan. 7, 2020

(54) METHODS AND SYSTEMS FOR AUTO-COMPLETION OF ANONYMIZED STRINGS

(71) Applicant: FACEBOOK, INC., Menlo Park, CA (US)

(72) Inventor: Amir Livneh, Tel-Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 514 days.

(21) Appl. No.: 15/332,853

(22) Filed: Oct. 24, 2016

(65) Prior Publication Data
US 2018/0115625 A1 Apr. 26, 2018

(51) Int. Cl.
*G06F 15/16* (2006.01)
*H04W 12/02* (2009.01)
*H04L 29/08* (2006.01)

(52) U.S. Cl.
CPC .......... *H04W 12/02* (2013.01); *H04L 67/142* (2013.01); *H04L 67/18* (2013.01)

(58) Field of Classification Search
CPC ............. H04W 12/02; H04W 12/001; H04W 12/12007; H04W 12/007; H04W 48/14; G06F 11/6254; G06F 12/20; H04L 63/0281; H04L 63/0421; H04L 67/142; H04L 67/18; H04B 1/7075; H04B 1/70753; H04M 1/274558; H04J 11/0086
USPC .................................. 709/203, 228, 227, 229
See application file for complete search history.

(56) References Cited

U.S. PATENT DOCUMENTS

| | | | |
|---|---|---|---|
| 7,984,169 B2 * | 7/2011 | Brunell | G06F 21/6254 709/229 |
| 8,001,021 B1 * | 8/2011 | Quinn | G06Q 10/063 705/31 |
| 10,051,066 B1 * | 8/2018 | Mirisola | H04L 67/22 |
| 2003/0014654 A1 * | 1/2003 | Adler | G06F 21/6245 726/6 |
| 2007/0106892 A1 * | 5/2007 | Engberg | G06Q 20/02 713/168 |
| 2008/0021884 A1 * | 1/2008 | Jones | G06F 16/951 |
| 2009/0254971 A1 * | 10/2009 | Herz | G06Q 10/10 726/1 |
| 2009/0282468 A1 * | 11/2009 | Banga | H04L 29/12122 726/8 |
| 2014/0201541 A1 * | 7/2014 | Paul | G06F 21/6245 713/193 |
| 2014/0280290 A1 * | 9/2014 | Baumgartner | G06F 16/3323 707/767 |

(Continued)

*Primary Examiner* — Thu Ha T Nguyen
(74) *Attorney, Agent, or Firm* — Morgan, Lewis & Bockius LLP

(57) ABSTRACT

A proxy server receives, from a client device, a partial query entered at the client device. The partial query includes a first substring of a full query. The first substring is replaced with a first anonymized string that is correlated with the first substring. The first anonymized string is forwarded to a web server. A second anonymized string stored by the web server in association with the first anonymized string is received from the web server in response to the first anonymized string. The second anonymized string is translated into a first de-anonymized string that is correlated with the second anonymized string. A first autocomplete suggestion including the first de-anonymized string is sent to the client device.

19 Claims, 8 Drawing Sheets

(56) References Cited

U.S. PATENT DOCUMENTS

| | | | |
|---|---|---|---|
| 2014/0380489 A1* | 12/2014 | Hacid | G06F 21/6254 726/26 |
| 2015/0149879 A1* | 5/2015 | Miller | G06F 17/243 715/226 |
| 2015/0220945 A1* | 8/2015 | Iannace | G06Q 30/0202 705/7.31 |
| 2015/0287113 A1* | 10/2015 | Dearing | G06Q 30/0611 705/26.4 |
| 2015/0348083 A1* | 12/2015 | Brill | G06Q 30/0222 705/14.23 |
| 2015/0356257 A1* | 12/2015 | Wright | H04L 9/0894 705/51 |
| 2015/0358764 A1* | 12/2015 | Piemonte | G06F 16/29 455/456.3 |
| 2015/0363403 A1* | 12/2015 | Khalatov | G06Q 10/107 707/723 |
| 2016/0048856 A1* | 2/2016 | Wouhaybi | G06Q 30/02 705/7.33 |
| 2016/0048868 A1* | 2/2016 | Mirisola | G06Q 30/0245 705/14.44 |
| 2016/0119289 A1* | 4/2016 | Jain | H04L 63/0281 726/12 |
| 2017/0142158 A1* | 5/2017 | Laoutaris | H04L 67/306 |
| 2017/0207916 A1* | 7/2017 | Luce | H04L 9/14 |
| 2017/0243028 A1* | 8/2017 | LaFever | G06F 21/6254 |
| 2018/0096365 A1* | 4/2018 | Noyes | G06Q 30/0244 |
| 2018/0101874 A1* | 4/2018 | Laski | G06Q 30/0271 |
| 2018/0165344 A1* | 6/2018 | Williams | H04L 63/10 |
| 2018/0232488 A1* | 8/2018 | Jafer | G06F 16/215 |
| 2018/0358112 A1* | 12/2018 | Sharifi Sedeh | G06F 19/00 |
| 2019/0050683 A1* | 2/2019 | Gupta Hyde | G06K 9/6257 |
| 2019/0087835 A1* | 3/2019 | Schwed | G06Q 30/0201 |
| 2019/0097907 A1* | 3/2019 | Nickolov | H04L 43/0817 |
| 2019/0102397 A1* | 4/2019 | Hornkvist | G06F 16/24578 |
| 2019/0156061 A1* | 5/2019 | Chakraborty | G06F 21/6254 |

* cited by examiner

METHODS AND SYSTEMS FOR AUTO-COMPLETION OF ANONYMIZED STRINGS

TECHNICAL FIELD

This relates generally to network communications, including but not limited to anonymizing search data by a server system.

BACKGROUND

Mobile devices have become an increasingly dominant means through which consumers access, download, and consume electronic content over the Internet.

Despite substantial advancements in telecommunications technology, however, achievable access to the Internet is still limited. Given the limited availability of Internet access in certain geographic regions, such as developing countries, consumers often have difficulty accessing the Internet and therefore are often left frustrated when using mobile devices. For example, it may be a violation of regulations of one or more countries to release personal identifiable information (PII) of users to other countries in the course of providing Internet access. Meanwhile, auto-complete suggestions of search queries have provided a significant boost in convenience, especially on smaller, modern devices such as mobile phones, where typing can be difficult. However, because these queries may sometimes contain PII, it remains a problem that in a restrictive country, such queries cannot be transmitted to a server typically used to store auto-complete suggestions, which may be in a country different than that of the user device. Furthermore, it remains a problem that because the auto-complete suggestions themselves may contain PII, the server cannot store the auto-complete suggestions for user devices operating out of restrictive countries.

SUMMARY

Accordingly, there is a need for methods, devices, and systems for improving network operability and search functionality while protecting personal identifiable information (PII). Embodiments set forth herein are directed to methods, devices, and systems for anonymization of search queries and auto-complete suggestions. For example, some countries have regulations that prohibit personal identifiable information (PII) to be released out of the countries. By having a proxy server with a string anonymizer located in the same region (e.g., the same country) as one or more user devices, which is for processing requests exchanged between the user devices and a server system outside the region, the user devices can exchange anonymized information (e.g., anonymized search queries and auto-complete suggestions) with the server system outside the region without releasing PII to the server system.

In accordance with some embodiments, a method is performed at a proxy server having one or more processors and memory storing instructions for execution by the one or more processors. The proxy server is coupled to a client device and a web server. The method includes receiving, from the client device, a partial query entered at the client device. The partial query includes a first substring of a full query. The first substring is replaced with a first anonymized string that is correlated with the first substring. The first anonymized string is forwarded to the web server. A second anonymized string stored by the web server in association with the first anonymized string is received from the web server in response to the first anonymized string. The second anonymized string is translated into a first de-anonymized string that is correlated with the second anonymized string. A first autocomplete suggestion including the first de-anonymized string is sent to the client device.

In accordance with some embodiments, a method is performed at a proxy server having one or more processors and memory storing instructions for execution by the one or more processors. The proxy server is coupled to a client device and a web server. The method includes receiving, from the client device, a partial query entered at the client device. The partial query includes a first substring of the full query. The first substring is replaced with a first anonymized string that is correlated with the first substring. One or more anonymized strings stored at the proxy server in association with the first anonymized string are identified and translated into one or more respective de-anonymized strings. The first substring is a substring of each of the de-anonymized strings. The one or more de-anonymized strings are forwarded to the client device as one or more autocomplete suggestions.

In accordance with some embodiments, a proxy server has one or more processors and memory storing instructions for execution by the one or more processors. The instructions include instructions for performing either or both of the above methods. In accordance with some embodiments, a non-transitory computer-readable storage medium has stored therein instructions that, when executed by the proxy server, cause the proxy server to perform either or both of the above methods.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first item could be termed a second item, and, similarly, a second item could be termed a first item, without departing from the scope of the various described embodiments. The first item and the second item are both items, but they are not the same item.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
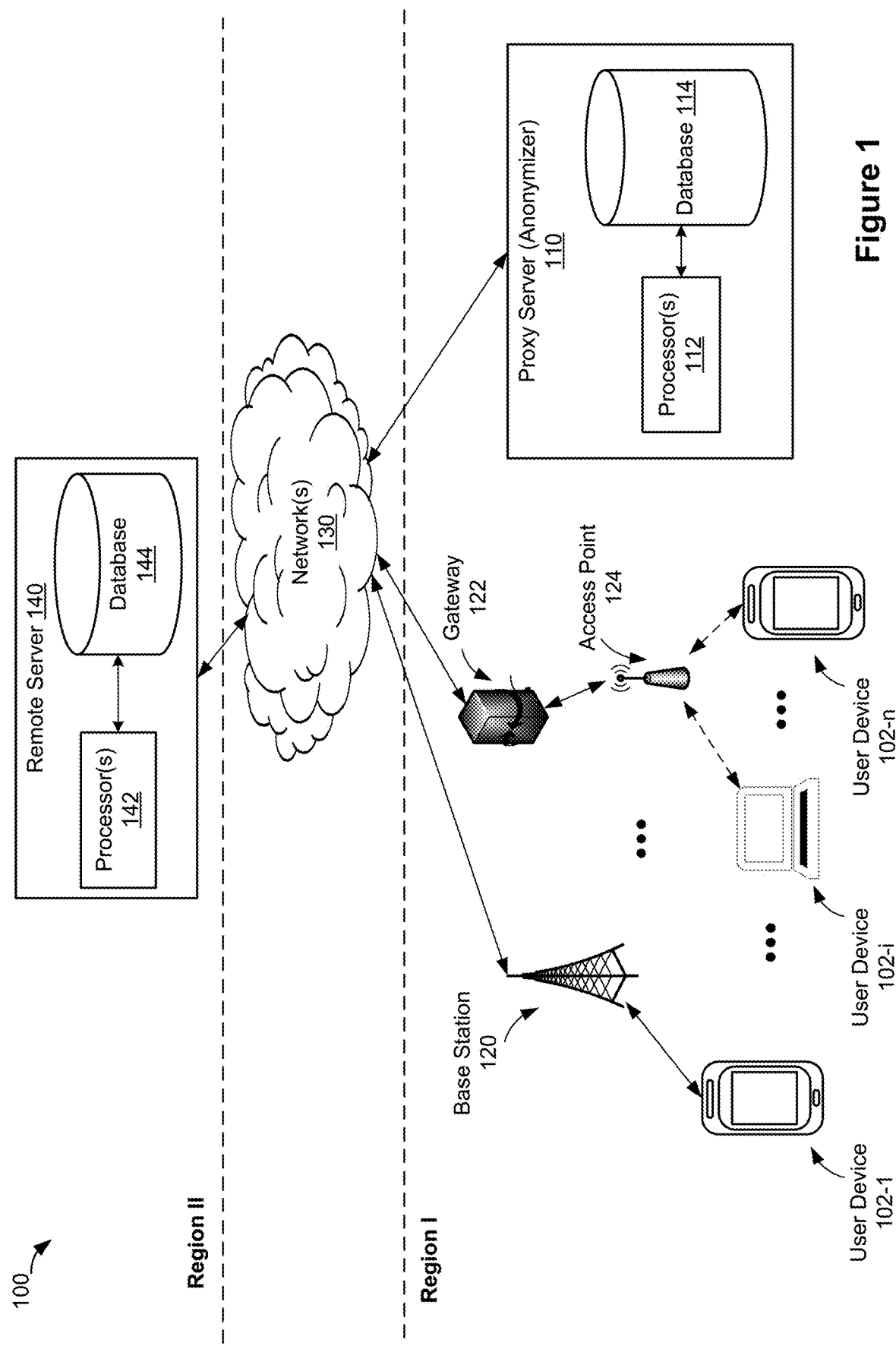
FIG. 1 is a block diagram illustrating a network architecture for providing network services, in accordance with some embodiments.

FIG. 1 illustrates a network architecture 100 in accordance with some embodiments. The network architecture 100 allows mobile carriers (and/or network providers) to provide Internet service to one or more users. The network architecture 100 routes the traffic from one or more user devices 102 to destination IP addresses. The network architecture 100 thus provides various products and/or functionalities to the users.

The network architecture 100 includes client-side modules (e.g., as discussed with reference to FIG. 2) executed on a number of user devices (also called "client devices," "client systems," "client computers," "subscriber devices" or "clients") 102-1, 102-2 . . . 102-n, and server-side modules (e.g., as discussed with reference to FIGS. 3 and 4) executed on one or more server systems, such as a proxy server 110 and a remote server 140. The user devices 102 communicate with the server systems (e.g., the proxy server 110 and the remote server 140) through one or more networks 130 (e.g., the Internet, cellular telephone networks, mobile data networks, other wide area networks, local area networks, metropolitan area networks, and so on). Client-side modules provide client-side functionalities for the network service platform (e.g., Internet service) and communications with server-side modules. Server-side modules provide server-side functionalities for the network service platform (e.g., routing network traffic, providing autocomplete suggestions, serving internet content based on searches, anonymizing and managing PII) for any number of user devices 102.

In some embodiments, the user devices 102 are mobile devices and/or fixed-location devices. The user devices 102 are associated with users (e.g., subscribers) who employ the user devices 102 to access one or more IP addresses. The user devices 102 execute web browser applications and/or other applications that can be used to access the one or more IP addresses.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the proxy server 110 and the remote server 140.

In some embodiments, the network architecture 100 includes one or more base stations 120 for carrier networks that provide cellular service to the user devices 102. One or more network operators (e.g., network service providers, network carriers, or cellular companies) own or control the one or more base stations 120 and related infrastructure. For example, the base station 120 communicably connects one or more user devices 102 (e.g., 102-1) to one another and/or to the networks 130. In some embodiments, the network architecture 100 includes one or more gateways 122 connected to one or more wireless access points 124 respectively for providing Wi-Fi networks to the user devices 102 (e.g., 102-i, 102-n). The base stations 120 and the gateways 122 are responsible for routing traffic between the networks 130 and the user devices 102.

In some embodiments, the user device(s) 102 reside in a region (e.g., Region I), while the remote server 140 resides in one or more different regions (e.g., Region II) from the one or more user devices 102. The regions may be countries, states, provinces, unions of countries, or other legal jurisdictions or geographical entities.

The remote server 140 is implemented on one or more standalone computers or a distributed network of computers. In some embodiments, the remote server 140 also employs various virtual devices and/or services of third party service providers (e.g., cloud computing) to provide the underlying computing resources and/or infrastructure resources of the remote server 140. The remote server 140 includes one or more processors/cores 142 and one or more databases 144. The one or more processors/cores 142 process requests for respective network services from the user devices 102, and provide responses including requested content to the user devices 102. The database 144 stores various information, including but not limited to anonymized PII such as information related to subscribers, information related to network operators, auto-complete suggestions, and query responses.

The proxy server 110 (e.g., an anonymizer) resides within the same region (e.g., Region I) as the one or more user devices 102. In order to protect user privacy and/or to comply with regulations of Region I, the proxy server 110 manages information exchanged between the subscriber devices and web servers (e.g., server systems including the remote server 140) outside of Region I. For example, the proxy server 110 anonymizes personal identifiable information (PII) of the subscribers such that the PII is not released to regions outside Region I.

In some embodiments, the PII includes any information that can be used to distinguish or trace an individual's identity, such as name, home address, personal phone number, personal email address, personal identifier (ID) (e.g., passport number, driver's license number, social security number, etc.), date of birth, place of birth, mother's maiden name, and/or biometric records. In some embodiments, the PII includes any other information that is linked or linkable to an individual, such as medical, educational, financial, and/or employment information. In some embodiments, the PII includes information related to a user device associated with an individual, such as a MAC address and/or other types of device identifier. The proxy server 110 is implemented on one or more standalone computers or a distributed network of computers (e.g., cloud computing).

The proxy server 110 includes one or more processors/cores 112 and one or more databases 114. The database 114 is used for anonymizing strings (e.g., partial and full search queries and responses) exchanged between the user devices 102 and the remote server 140. The one or more processors/cores 112 process partial and/or full search strings from the user devices 102 and anonymize these strings, which may contain PII. The database 114 stores various information relating to anonymized and de-anonymized strings.

Figure 2:
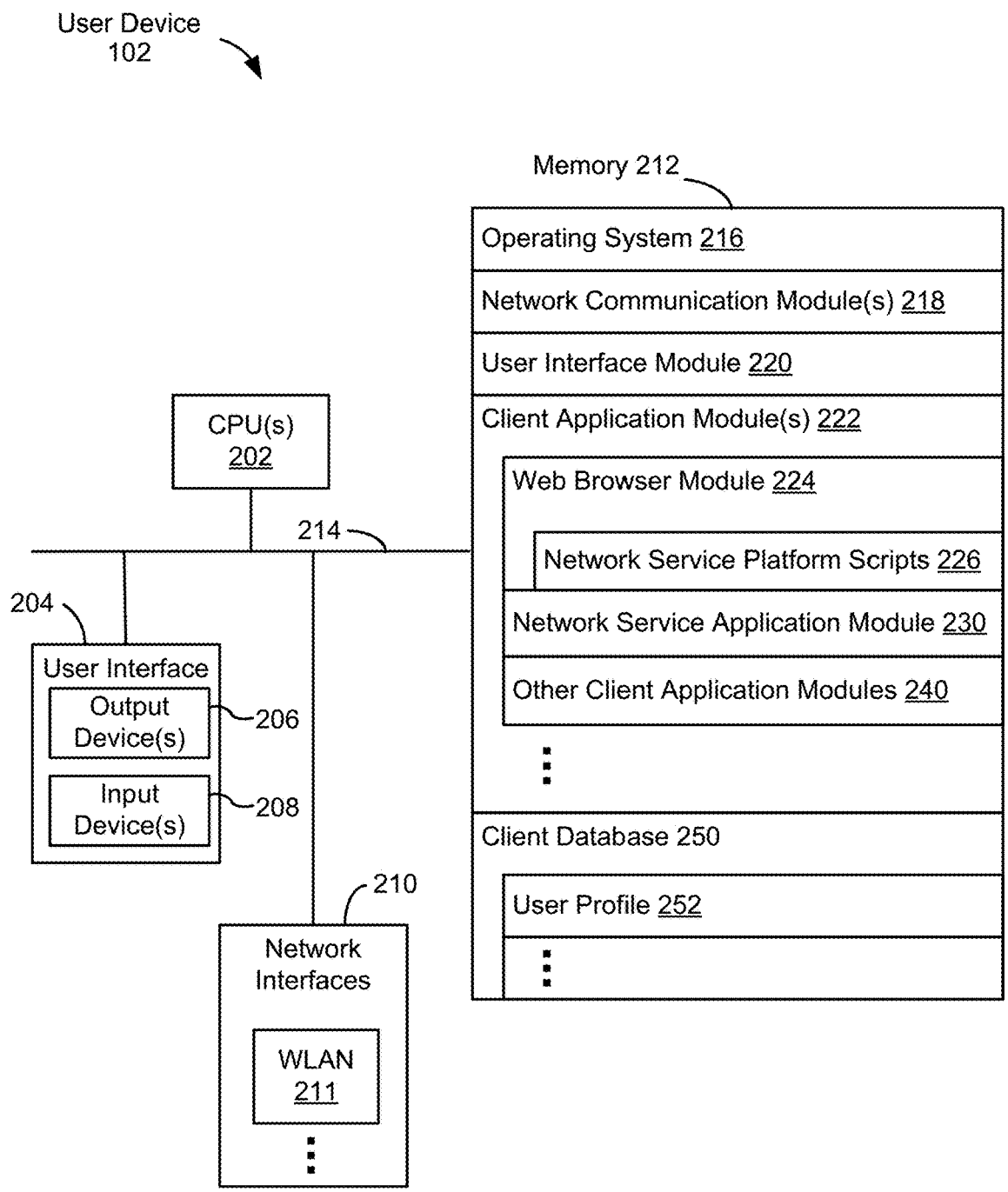
FIG. 2 is a block diagram illustrating a user device, in accordance with some embodiments.

FIG. 2 is a block diagram illustrating an exemplary user device 102 (e.g., one of the user devices 102-1 through 102-n of FIG. 1) in accordance with some embodiments. The user device 102 typically includes one or more central processing units (CPU(s)) (e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

The user device 102 includes a user interface 204, including output device(s) 206 and input device(s) 208. In some embodiments, the input devices include a keyboard or a track pad. Alternatively, or in addition, the user interface 204 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 206 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a global-navigation-satellite-system (GNSS) receiver (e.g., a GPS (global positioning system), GLONASS, or other geo-location receiver), and/or location-detection software for determining the location of the user device 102.

In some embodiments, the one or more network interfaces 210 include wireless and/or wired interfaces for receiving data from and/or transmitting data to other user devices 102, the proxy server 110, the remote server 140, and/or other devices or systems. In some embodiments, data communications are carried out using any of a variety of custom or standard wireless protocols (e.g., NFC, RFID, IEEE 802.15.4, IEEE 802.11/Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 210 includes a wireless LAN (WLAN) interface 211 for enabling data communications with other WLAN-compatible devices and/or the proxy server 110 (via the one or more network(s) 130, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the user device 102 to other computing devices (e.g., the proxy server 110, the remote server 140, other user devices 102, and/or other devices) via the one or more network interface(s) 210 (wired or wireless);
- a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);
- one or more client application modules 222, including the following modules (or sets of instructions), or a subset or superset thereof:
  - a web browser module 224 (e.g., Internet Explorer by Microsoft, Firefox by Mozilla, Safari by Apple, Opera by Opera Software, or Chrome by Google) for accessing, viewing, and interacting with web sites (e.g., zero-rated and/or non-zero-rated web sites), which includes network service platform (e.g., Free Basics platform) scripts 226 provided by the remote server 140 (e.g., as embedded in a web page) and executed by the web browser module 224;
  - a network service application module 230 for providing an interface to a network service application (e.g., Free Basics application provided by the remote server 140) and related features. For example, the network service application module 230 may provide links to the remote server 140; and other optional client application modules 240, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and client database 250 for storing data associated with the social networking platform, including, but not limited to:

user profile 252 storing a user profile associated with the user of a client device 102 including, but not limited to, user account information (including PII), login credentials to the network service platform, payment data (e.g., linked credit card information, app credit or gift card balance, billing address, shipping address, etc.), bookmarked links, custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information.

A zero-rated web site is a web site that is provided to users for free, such that users can access the website without being charged for network access. The content on a zero-rated web site, which is called zero-rated content, thus may be accessed without paying for network access. Free Basics is an example of a platform that provides zero-rated content. In contrast, a non-zero-rated website cannot be accessed for free; instead, users are charged for network access when accessing a non-zero-rated website. Content on a non-zero-rated website is called non-zero-rated content.

Each of the above-identified modules and applications corresponds to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

Figure 3:
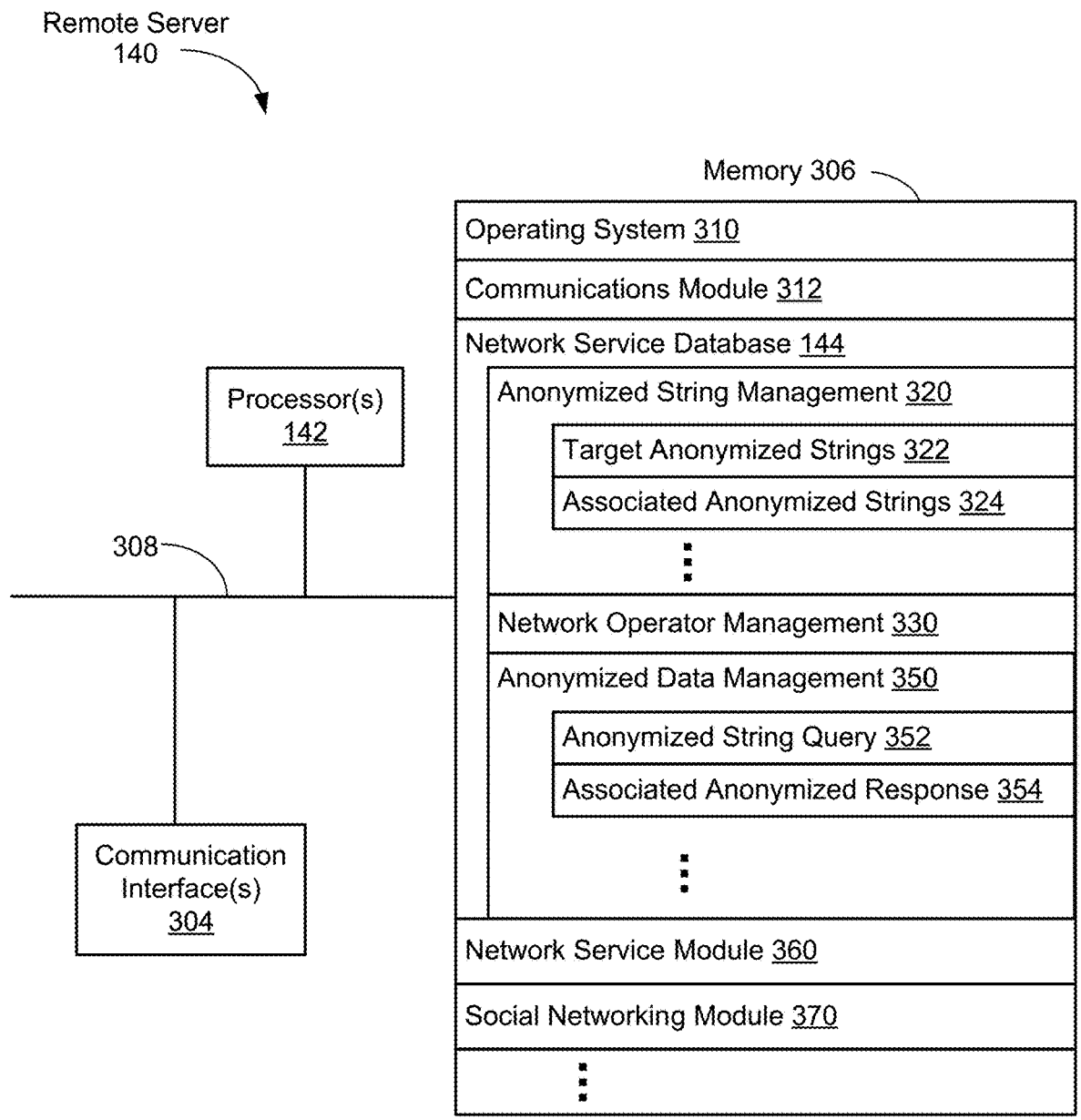
FIG. 3 is a block diagram illustrating a remote server of a server system, in accordance with some embodiments.

FIG. 3 is a block diagram illustrating an exemplary remote server 140 (e.g., a web server) in accordance with some embodiments. The remote server 140 includes one or more processing units (processors or cores) 142, one or more network or other communications interfaces 304, memory 306, and one or more communication buses 308 for interconnecting these components. The communication buses 308 optionally include circuitry (sometimes called a chipset) that interconnects and controls communications between system components. The remote server 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display. Memory 306 includes high-speed random-access memory, such as DRAM, SRAM, DDR RAM, or other random-access solid-state memory devices, and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 142. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

an operating system 310 that includes procedures for handling various basic system services and for performing hardware dependent tasks;

a network communication module 312 that is used for connecting the remote server 140 to other computers via the one or more communication network interfaces 304 (wired or wireless) and one or more communication networks (e.g., the one or more networks 130);

a network service database 144 for storing data associated with the network service platform (e.g., Free Basics), which includes:

anonymized string management 320, including but not limited to:

target anonymized strings 322, including, but not limited to, anonymized partial queries of full queries that have been entered at user device 102 and may contain PII; and associated anonymized strings 324, including, but not limited to, anonymized full queries that are associated with respective anonymized sub strings 322 and may contain PII; and network operator management information 330 including network operator information such as network segment information, network type, IP addresses hosted by a respective network operator, etc.;

anonymized data management 350, including but not limited to:

anonymized string queries 352, including, but not limited to, anonymized queries that have been entered at user device 102 and may contain PII; and associated responses 354, including, but not limited to, anonymized responses that are associated with respective anonymized string queries 352 and may contain PII.

a network service module 360 for providing network service and related features (e.g., in conjunction with browser module 224 or network services application module 230 on the user device 102, FIG. 2); and a social networking module 370 for providing social-networking services and related features (e.g., in conjunction with browser module 224 or social network application client module on the client device 102, FIG. 2).

As described above, target anonymized strings 322, associated anonymized strings 324, anonymized string queries 352, and associated responses 354 may include PII and/or non-PII, such as one or more data items of a user account. Data items may include, for example, user profiles, login information, privacy and other preferences, biographical data, full name, mobile number, contact information, birth date, sex, marital status, family status, employment, education background, preferences, interests, other demographic information, etc.

In some embodiments, the network service module 360 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 4:
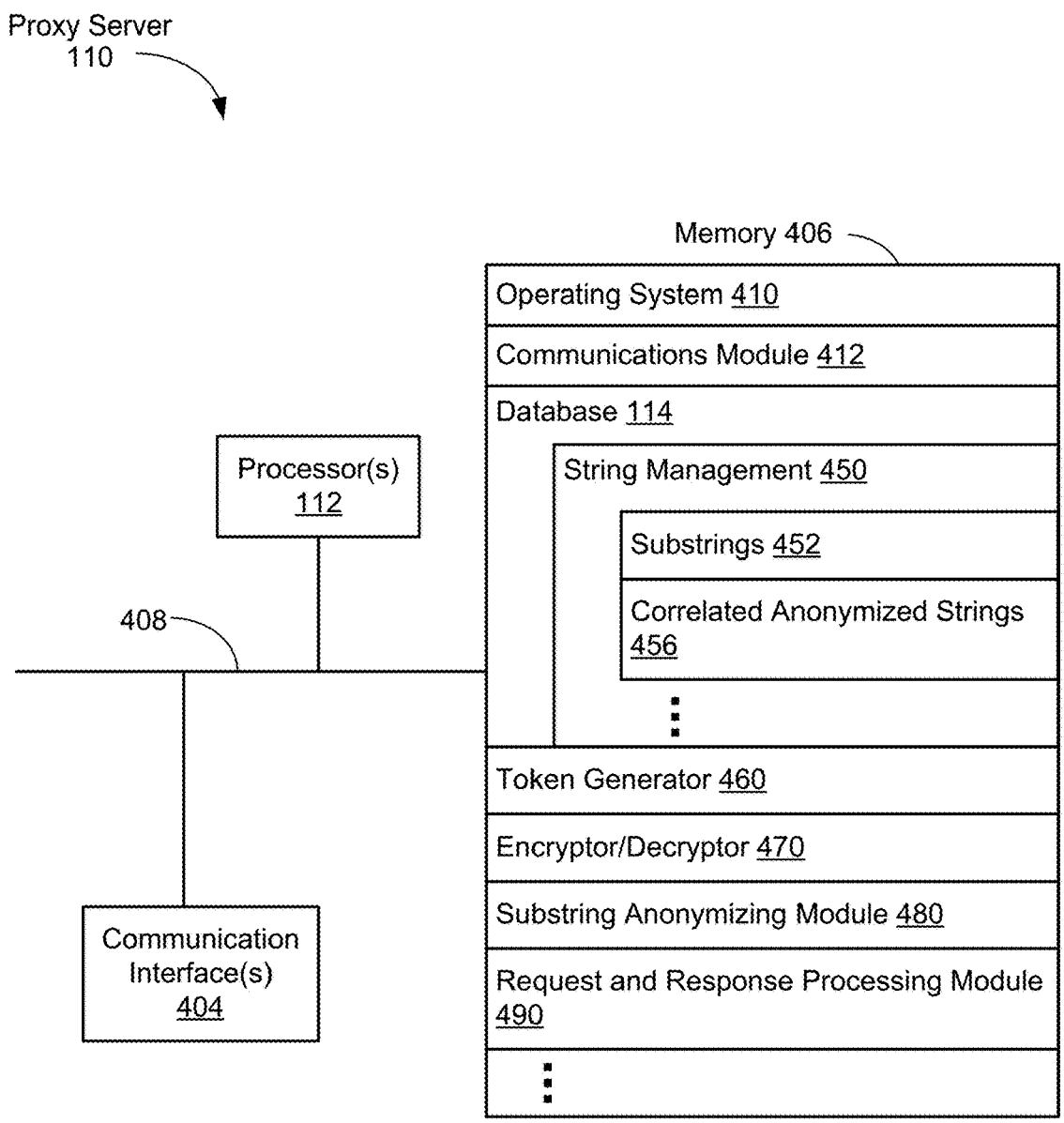
FIG. 4 is a block diagram illustrating a proxy server of a server system, in accordance with some embodiments.

FIG. 4 is a block diagram illustrating an exemplary proxy server 110 in accordance with some embodiments. The proxy server 110 includes one or more processing units (processors or cores) 112, one or more network or other communications interfaces 404, memory 406, and one or more communication buses 408 for interconnecting these components. The communication buses 408 optionally include circuitry (sometimes called a chipset) that interconnects and controls communications between system components. The proxy server 110 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 406 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 406 may optionally include one or more storage devices remotely located from the processor(s) 112. Memory 406, or alternately the non-volatile memory device(s) within memory 406, includes a non-transitory computer-readable storage medium. In some embodiments, memory 406 or the computer-readable storage medium of memory 406 stores the following programs, modules and data structures, or a subset or superset thereof:

- an operating system 410 that includes procedures for handling various basic system services and for performing hardware dependent tasks;
- a network communications module 412 that is used for connecting the proxy server 110 to other computers via the one or more network communication interfaces 404 (wired or wireless) and one or more communication networks (e.g., the one or more networks 130);
- a database 114 for storing data and corresponding anonymized data for each user, which includes:
  string management 450, including but not limited to:
    substrings 452, including, but not limited to, partial queries of full queries that have been entered at user device 102 and may contain PII;
    correlated anonymized strings 456, including, but not limited to, anonymized strings that are correlated with respective substrings 452 and that may contain anonymized PII; and
  a token generator 460 (e.g., a pseudo-random-number generator) for generating a token (e.g., a pseudo-random number) to be assigned to each string or substring such as substrings 452;
  encryptor/decryptor 470 for encrypting or decrypting strings using a key stored at proxy server 110 and unavailable to remote server 140;
  a substring anonymizing module 480 for anonymizing and deanonymizing strings such as substrings 452 using, for example, token generator 460 or encryptor/decryptor 470; and
  a request-and-response processing module 490 for processing requests and responses received from the user device 102 and/or a web server (e.g., the remote server 140), including, but not limited to, replacing user-readable strings with anonymized data and/or vice versa through use of the anonymizing module 480, and optionally sorting data in response to a search query.

Figure 5A:
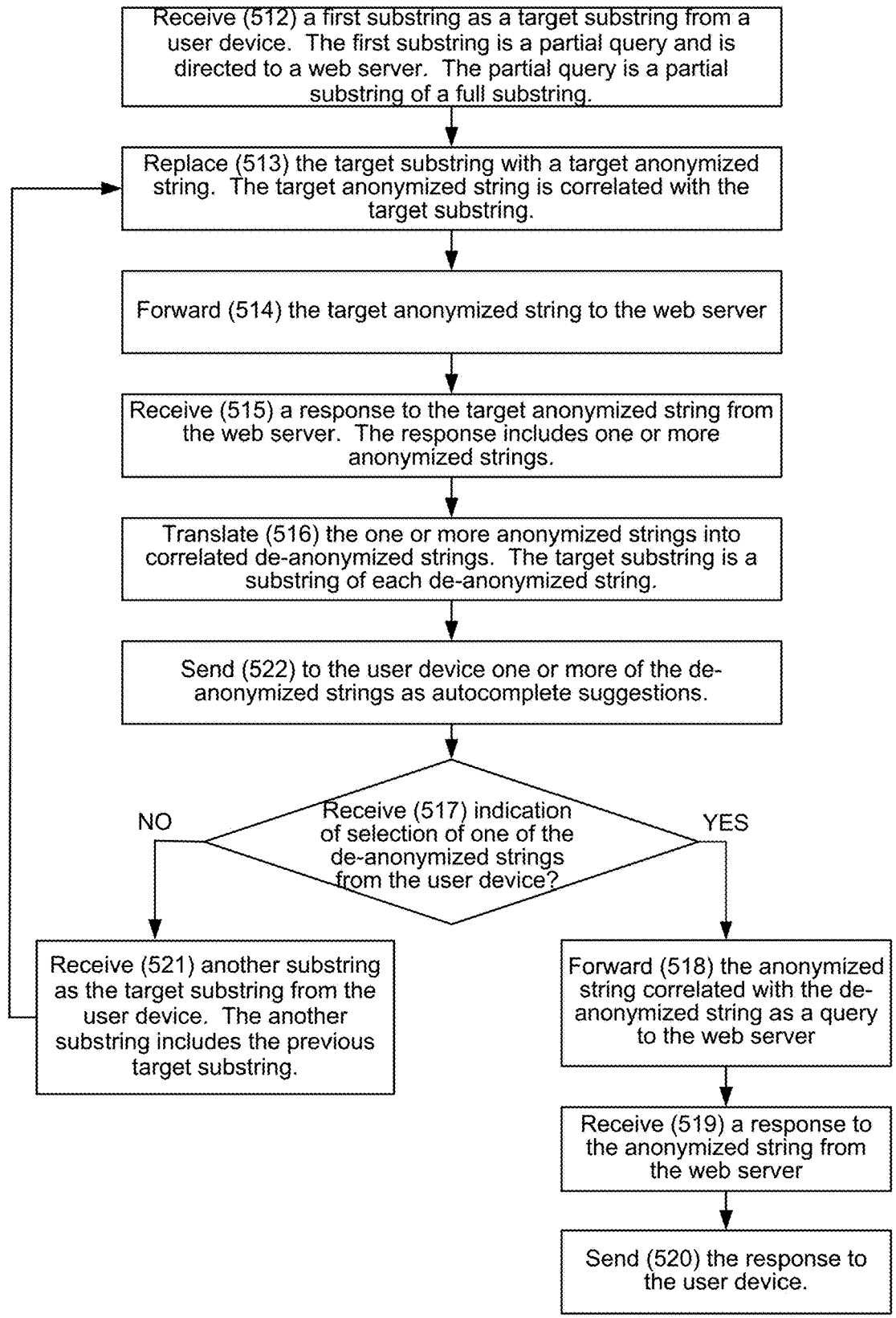
FIG. 5A is a flow diagram illustrating a method for search anonymization, in accordance with some embodiments.

FIG. 5A is a flow diagram illustrating a method 500 for the auto-completion of anonymized strings, in accordance with some embodiments. The method 500 is performed by a server system (e.g., proxy server 110, FIGS. 1 and 4). Operations performed in FIG. 5A correspond to instructions stored in computer memories (e.g., memories 406, FIG. 4) or other computer-readable storage mediums. In some embodiments, the user device described in method 500 is any user device 102 (FIGS. 1-2). In some embodiments, the web server described in method 500 is the remote server 140 (FIGS. 1 and 3).

In some embodiments, the proxy server 110 (e.g., FIGS. 1 and 4) receives (512) a first substring as a target substring 452 from a user device 102 (e.g., the user device 102-1, FIGS. 1-2), after the user device 102 has sent the substring to the proxy server 110. The substring 452 may be a partial search query for a search engine and directed to a web server such as remote server 140 (e.g., FIGS. 1 and 3). The partial search query may be part of (e.g., the beginning of) a full substring representing a full search query. The full search query may be used for inquiring about information associated with the user's account, such as for asking for an account balance or for viewing network service plans that are available to the user account. In some embodiments, the partial and full search queries may be sent from a user device 102 associated with a network operator and used for sending a query for business information, such as a query for a sales report. The partial search query and/or full search query may include one or more data items of PII associated with the user, such as a user name, a user phone number, a user address, and/or other types of PII. The partial search query and/or full search query may additionally or alternatively include data items of non-PII (not shown).

As illustrated in FIG. 1, in some embodiments, the proxy server 110, the database 114 for the proxy server 110, and the user devices 102 are located in a first geographic region (e.g., Region I), while the web server (e.g., remote server 140) is located in a second geographic region (e.g., Region II). In some embodiments, the first geographic region is a first country (or other jurisdiction) and the second geographic region is a second country (or other jurisdiction) distinct from the first country. The first country may have a policy of not allowing PII to be transmitted out of its own country.

With reference again to FIG. 5A, in some embodiments, after receiving the first substring as the target substring 452, the string management 450 of proxy server 110 (e.g., FIG. 4) replaces (513) the target substring 452 with a target anonymized string 456. The string management 450 correlates the target anonymized string 456 with the target substring 452, and may store the target substring 452 and target anonymized string 456 together with this correlation in database 114 (e.g., in a translation table).

In some embodiments, the target anonymized string 456 is an anonymization of the target substring 452. String management 450 of the proxy server 110 may check the database 114 to determine whether the target substring 452 already has a correlated target anonymized string 456, and if so, may replace the target substring 452 with the correlated target anonymized string 456. Otherwise, and in embodiments where this determination is not made, substring anonymizing module 480 (e.g., FIG. 4) of the proxy server 110 may anonymize the target substring 452 using token generator 460 or encrypter/decryptor 470.

For example, in some embodiments, the anonymizing module 480 may use token generator 460 to randomly/pseudo-randomly generate a token for the target substring 452. The token may be a string including a plurality of numbers, values, characters, punctuation marks, and/or other types of symbols. In some examples, a token is a 128-bit string.

As another example, in some embodiments, the anonymizing module 480 may use encryptor/decryptor 470 to encrypt the target substring 452 using, for example, a key stored at the proxy server 110 and that is not available outside Region I, including not being available to remote server 140 (e.g., FIG. 1).

In some embodiments, anonymizing module 480 stores the anonymized strings 456 in correlation with the target substrings 452, such as in a translation table.

In some embodiments, after replacing the target substring 452 with the correlated target anonymized string 456, the proxy server 110 may forward (514) the target anonymized string to a web server (e.g., remote server 140) via the network(s) 130. The web server (e.g., remote server 140) may be in a region outside Region I, such as Region II. Therefore, target substrings (e.g., partial search queries) that may contain items of PII are anonymized by proxy server 110 before being transmitted out of Region I to the web server (e.g., remote server 140). No PII is released to other regions outside Region I, in accordance with some embodiments.

In some embodiments, the web server (e.g., remote server 140) may store (e.g., in database 144) one or more (e.g., a plurality of) anonymized strings 324 in association with target anonymized strings 322, prior to receiving the target anonymized string 456 from the proxy server 110 (see FIG. 3). For example, in some examples, only one anonymized string 324 may be stored in correlation with a target anonymized string 322, while in other examples, a plurality of anonymized strings 324 may be stored in correlation with a target anonymized string 322. The web server (e.g., remote server 140) receives the target anonymized string 456 from the proxy server 110 over network(s) 130, and then may check the database 144 for the target anonymized string 456's presence as one of the target anonymized strings 322 stored in database 144, and send to the proxy server 110 the one or more anonymized strings 324 that are associated with this target anonymized substring 322. The associated anonymized strings 324 may be anonymized autocomplete suggestions (e.g., anonymized full queries) for the substring that was entered at the user device 102. When de-anonymized, the associated anonymized strings 324 may contain PII. However, because the strings 324 are anonymized, the remote server 140 (which may be outside of Region I) does not have access to this PII.

In some embodiments, the proxy server 110 receives (515) a response to the target anonymized string 456 from the remote server 140. The response may include the one or more anonymized strings 324 stored by the remote server 140 in association with the target anonymized string 456 (the target anonymized substring 322) and sent to the proxy server 110.

Upon receiving the one or more anonymized strings as a response, the proxy server 110 translates (516) the one or more anonymized strings into correlated de-anonymized strings and stores this correlation in database 114. For example, in embodiments where the one or more anonymized strings are tokenized strings, the proxy server 110 may identify the tokenized strings in database 114 and thereby translate them into the correlated de-anonymized strings also stored in database 114 (e.g., as part of a translation table). As another example, in embodiments where the one or more anonymized strings are encrypted with, e.g., the key stored at the proxy server 110, encryptor/decryptor 470 of the proxy server 110 may decrypt the one or more anonymized strings using this key to translate them into the correlated de-anonymized strings. In some embodiments, the target substring 452 is a substring of each of the de-anonymized strings. For example, the target sub string 452 is a prefix of each of the de-anonymized strings.

The proxy server 110 then sends (522) to the user device 102, over network(s) 130, one or more of the de-anonymized strings as autocomplete suggestion(s) for the target substring entered by the user. The user device 102 may display the autocomplete suggestion(s). For example, the autocomplete suggestions may be displayed on the user device 102 in an alphabetical sequence, in a sequence based on recent searches by the same user, in a sequence based on recent popular searches by different users, based on a certain relevance, etc. Furthermore, all of the autocomplete suggestions may be displayed, or only a number of the top ranked autocomplete suggestions may be displayed.

The user may select one of the autocomplete suggestions by, e.g., using a mouse, Enter key, voice input, etc. (e.g., any of the variety of input devices 208 described above with reference to FIG. 2). If the user selects one of the autocomplete suggestions, the user device 102 sends the indication of selection to the proxy server 110 over network(s) 130.

However, the proxy server 110 may not receive an indication that the user has selected one of the autocomplete suggestions. This may occur when, for example, the user keeps typing a search query rather than selecting one of the autocomplete suggestions. In such an example, the user device 102 may proceed to send another substring to the proxy server 110 over network(s) 130. The proxy server 110 receives (521) this other substring as the new target substring, which may include the previous target substring as, e.g., a prefix. The proxy server 110 then proceeds to replace (513) this target substring with a target anonymized substring, following the same method as described above, and the process described for FIG. 5A repeats itself until, e.g., the user enters a full search query, as indicated by, for, example, pressing the Enter key or a search button, or until the user selects one of the autocomplete suggestions which the proxy server 110 receives (517) as an indication of selection.

After the proxy server 110 receives (517) an indication of selection of one of the autocomplete suggestions from the user device 102, the proxy server 110 retrieves the anonymized string correlated with the selected autocomplete suggestion and forwards (518) this anonymized string to the web server (e.g., remote server 140) over network(s) 130.

After the proxy server 110 forwards (518) the anonymized string to the remote server 140 over network(s) 130, the anonymized data management 350 of remote server 140 may receive this anonymized string as an anonymized string query 352. The anonymized data management 350 may have stored an associated response 354 correlated with the anonymized string query 352, and may send this associated response 354 back to the proxy server 110 over network(s) 130. In some embodiments, the associated response 354 may be anonymized through, e.g., encryption or tokenization. The associated response 354 may be the result(s) of the user's string query (e.g., a search result), and may include one or more data items of the user's account (e.g., PII).

In some embodiments, the proxy server 110 may receive (519) this associated response from the remote server 140 as a response to the anonymized string. In embodiments where the associated response is anonymized, the proxy server 110 may de-anonymize the associated response using, e.g., decryption or de-tokenization.

In some embodiments, the proxy server 110 may then send (520) the associated response to the user device. The user device 102 may receive the associated response and display it as a result of the user's search.

Figure 5B:
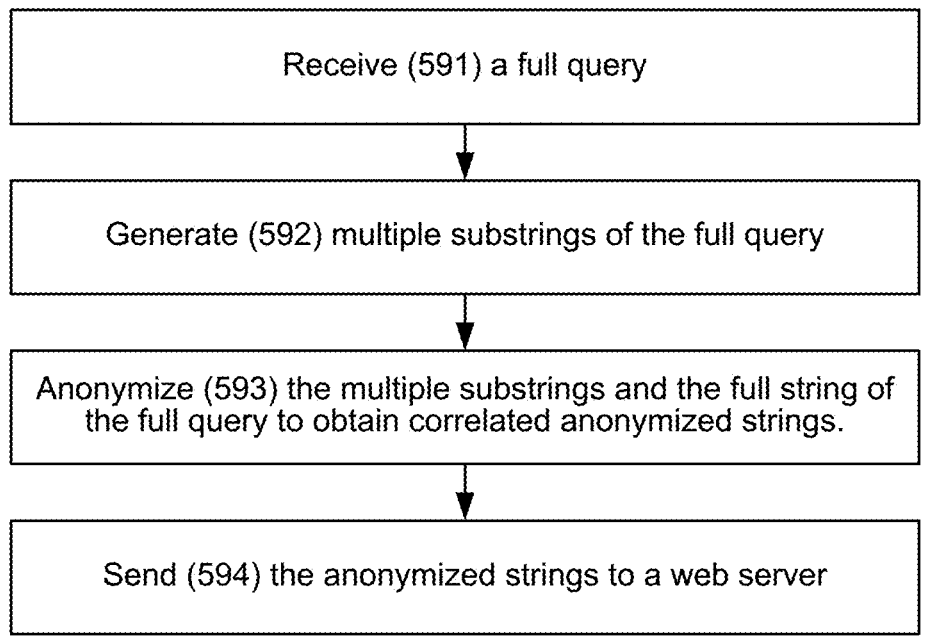
FIG. 5B is a block diagram illustrating a query registration process for search anonymization, in accordance with some embodiments.

FIG. 5B is a flow diagram illustrating a method 580 for generating and storing anonymized substrings based on a full query, in accordance with some embodiments. The method 580 is performed by proxy server 110 of a server system (e.g., FIGS. 1 and 4). Operations performed in FIG. 5B correspond to instructions stored in computer memories (e.g., memory 406, FIG. 4) or other computer-readable storage mediums. In some embodiments, the web server described in method 580 is the remote server 140 (FIGS. 1 and 3).

In some embodiments, the proxy server 110 may receive (591) a full query. This may occur, for example, during system pre-setting or during an initial sign-up when the proxy server 110 first receives the full query from a user device 102.

In some embodiments, the proxy server 110 may generate (592) multiple substrings of the full query. For example, the proxy server 110 may parse the full query into substrings of equal character length, such as three characters per sub string.

In some embodiments, substring anonymizing module 480 of the proxy server 110 may anonymize (593) the multiple substrings and the full string of the full query to obtain an anonymized string and correlated anonymized strings. The proxy server 110 may anonymize these strings using, for example, encryption via the encryptor/decryptor 470 and the encryption key stored at the proxy server 110, or tokenization using token generator 460.

In some embodiments, the proxy server 110 may send (594) the anonymized string and substrings to the remote server 140. The anonymized string management 320 of remote server 140 may store the anonymized strings (e.g., as associated anonymized strings 324) in correlation with the anonymized substrings (e.g., target anonymized substrings 322).

Figure 6A:
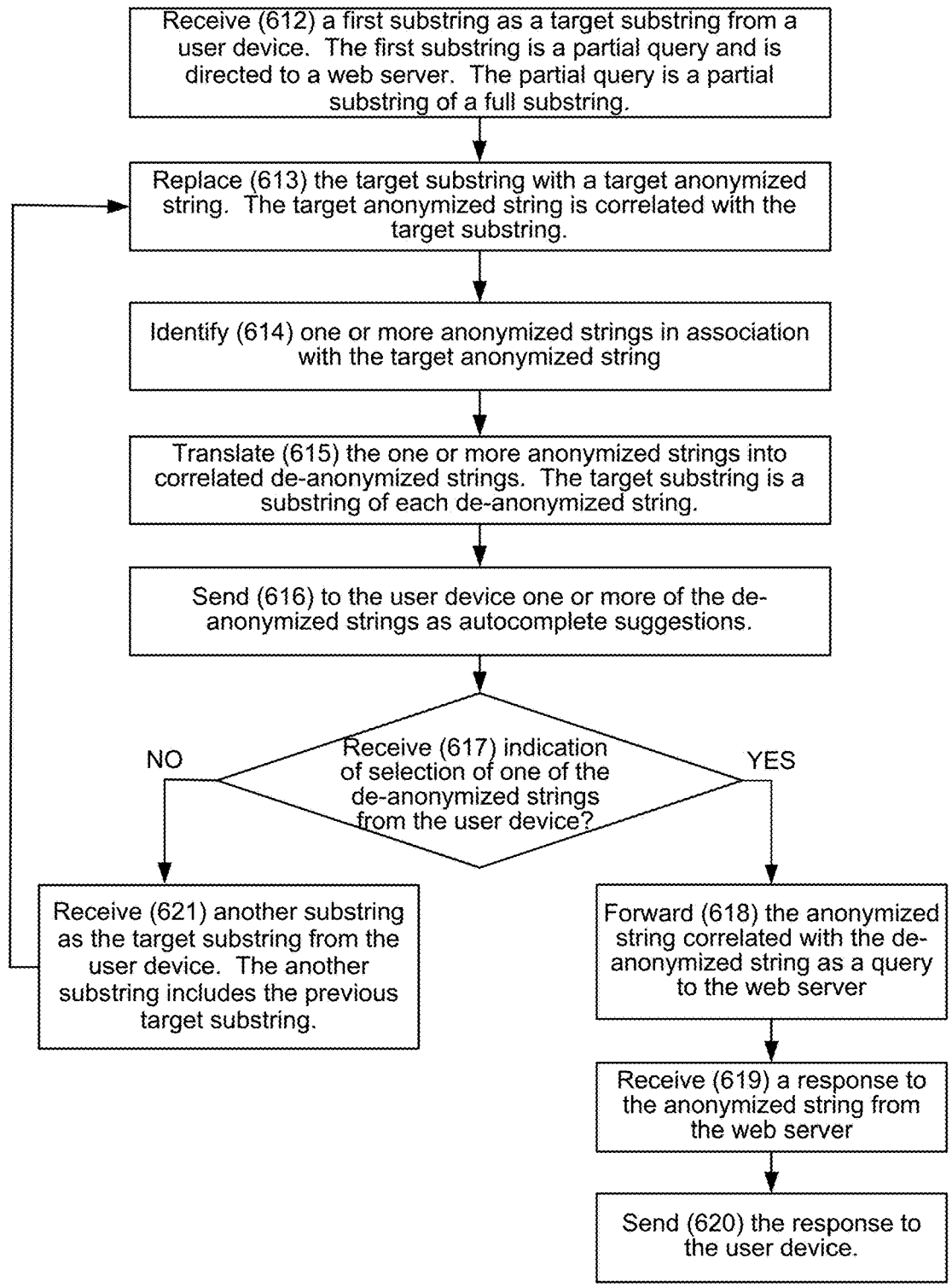
FIG. 6A is a flow diagram illustrating a method for search anonymization, in accordance with some embodiments.
Figure 6B:
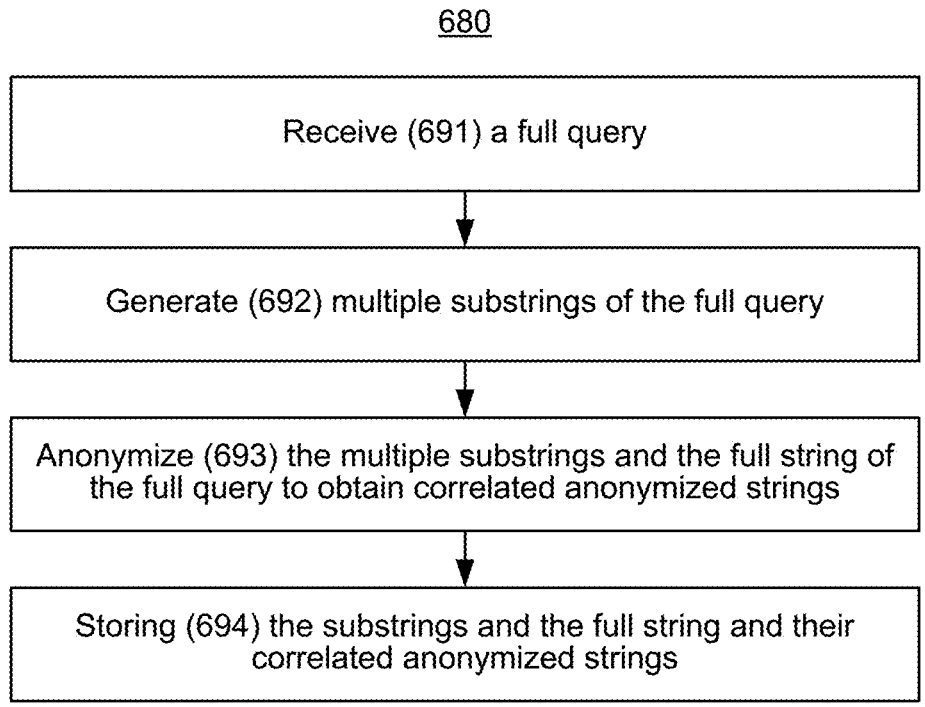
FIG. 6B is a flow diagram illustrating a query registration process for search anonymization, in accordance with some embodiments.

FIG. 6B is flow diagram illustrating a method 680 for generating and storing anonymized substrings based on a full query, in accordance with some embodiments. Differences between this method 680 and the method 580 depicted in FIG. 5B are hereinafter described. Particularly, with reference to FIG. 6B, in some embodiments, rather than, or in addition to sending (594) the anonymized strings to remote server 140 as depicted in FIG. 5B, the proxy server may itself store (694) the anonymized string in correlation with the anonymized substrings in database 114.

FIG. 6A is a flow diagram illustrating a method 600 for the auto-completion of anonymized strings in accordance with some embodiments such as those of FIG. 6B. As in method 500, the method 600 may be performed by proxy server 110 of a server system (e.g., FIGS. 1 and 4). Operations performed in FIG. 6A correspond to instructions stored in computer memories (e.g., memories 406, FIG. 4) or other computer-readable storage mediums. In some embodiments, the user device described in method 600 is any user device 102 (FIGS. 1-2). In some embodiments, the web server described in method 600 is the remote server 140 (FIGS. 1 and 3). Other differences between the method 500 and method 600 are hereinafter described.

For example, in embodiments where the proxy server 110 stores target anonymized substrings and associated anonymized strings, the proxy server 110 may identify (614) one or more anonymized strings in association with a target anonymized string, rather than forwarding (514) the anonymized string to the remote server 140 and receiving (515) a response from the remote server 140 that includes the one or more anonymized strings.

Like the method 500, the proxy server 110 may then translate (615) the one or more anonymized substrings into correlated de-anonymized strings and perform subsequent steps 616-621, which may be similar or identical to steps 517-522 of the method shown in FIG. 5A.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a proxy server having one or more processors and memory storing instructions for execution by the one or more processors, wherein the proxy server is coupled to a client device and a web server, the proxy server performing:
   receiving, from the client device, a partial query entered at the client device, wherein the partial query includes a first substring of a full query to be generated by an autocomplete suggestion;
   generating a first anonymized partial query by replacing the first substring with a first anonymized string, wherein the first anonymized string is correlated with the first substring;
   forwarding the first anonymized partial query to the web server;
   receiving, from the web server, in response to the first anonymized partial query, a second anonymized query stored by the web server in association with the first anonymized partial query, the second anonymized query corresponding to the autocomplete suggestion;
   translating the second anonymized query into a first de-anonymized query, wherein the first de-anonymized query is correlated with the second anonymized query; and
   sending, to the client device, the autocomplete suggestion including the first de-anonymized query, to generate the full query.

2. The method of claim 1, further comprising, at the proxy server:
receiving an indication of selection of the autocomplete suggestion from the client device;
in response to the indication, forwarding the second anonymized query to the web server;
receiving from the web server, in response to the second anonymized query, one or more data items of a user account related to the second anonymized query; and
providing the one or more data items to the client device.

3. The method of claim 1, further comprising, at the proxy server:
receiving a second substring of the partial query from the client device, wherein the second substring includes the first substring;
generating a third anonymized partial query by replacing the second substring with a third anonymized string, wherein the third anonymized string is correlated with the second substring;
forwarding the third anonymized partial query to the web server;
receiving, from the web server, in response to the third anonymized partial query, a fourth anonymized query stored by the web server in association with the third anonymized partial query;
translating the fourth anonymized query into a second de-anonymized query, wherein the second de-anonymized query is correlated with the fourth anonymized query; and
sending, to the client device, a second autocomplete suggestion including the second de-anonymized query.

4. The method of claim 1, further comprising, at the proxy server:
after forwarding the first anonymized partial query to the web server:
receiving, from the web server, a plurality of anonymized queries stored by the web server in association with the first anonymized query wherein the plurality of anonymized queries includes the second anonymized query;
translating the plurality of anonymized queries into respective de-anonymized queries including the first de-anonymized query, wherein the first substring is a substring of each de-anonymized query; and
sending one or more of the de-anonymized queries to the client device as autocomplete suggestions.

5. The method of claim 1, further comprising, at the proxy server, indexing the de-anonymized queries.

6. The method of claim 1, wherein the full query is a first full query, the method further comprising, at the proxy server:
receiving a second full query;
generating multiple partial queries from the second full query, wherein the partial queries include respective substrings;
anonymizing the respective substrings and a full string for the second full query to obtain respective anonymized queries, wherein the respective substrings and the full string for the second full query are correlated with their respective anonymized queries; and
sending the respective anonymized queries to the web server.

7. The method of claim 6, further comprising, at the proxy server, storing the anonymized queries in respective association with the respective substrings and the full string for the second full query.

8. The method of claim 1, wherein the first substring is a prefix of the first de-anonymized query.

9. The method of claim 1, wherein the full query is related to personally identifiable information (PII) associated with a user account.

10. The method of claim 1, wherein the first and the second anonymized queries are tokenized queries.

11. The method of claim 1, wherein:
replacing the first substring with the first anonymized string comprises encrypting the first substring using a key that is not available to the web server; and
translating the second anonymized query into the first de-anonymized query comprises decrypting the second anonymized query using the key.

12. The method of claim 1, wherein:
the proxy server and the client device are located in a first geographic region; and
the web server and a first database are located in a second geographic region.

13. A method, comprising:
at a proxy server having one or more processors and memory storing instructions for execution by the one or more processors, wherein the proxy server is coupled to a client device and a web server, the proxy server performing:
receiving, from the client device, a partial query entered at the client device, wherein the partial query includes a first substring of a full query to be generated by an autocomplete suggestion;
generating a first anonymized partial query by replacing the first substring with a first anonymized string, wherein the first anonymized string is correlated with the first substring;
identifying one or more anonymized queries stored at the proxy server in association with the first anonymized string;
translating the one or more anonymized queries into one or more respective de-anonymized queries, wherein the first substring is a substring of each of the de-anonymized queries; and
forwarding the one or more de-anonymized queries to the client device as one or more autocomplete suggestions.

14. The method of claim 13, further comprising, at the proxy server:
receiving, from the client device, an indication of selection of a first de-anonymized query from the one or more autocomplete suggestions;
in response to the indication, replacing the first de-anonymized query with a second anonymized query, wherein the second anonymized query is correlated with the first de-anonymized query;
sending the second anonymized query to the web server; and
in response to sending the second anonymized query to the web server, receiving, from the web server, one or more data items of a user account related to the second anonymized query; and
providing the one or more data items to the client device.

15. The method of claim 13, wherein the full query is a first full query, the method further comprising:
receiving a second full query;
generating multiple partial queries from the second full query, wherein the partial queries include respective substrings;
anonymizing the respective substrings and a full string for the first full query to obtain respective anonymized queries, wherein the respective substrings and the full string for the second full query are correlated with their respective anonymized queries; and storing the respective anonymized queries at the proxy server.

16. The method of claim 15, wherein storing the respective anonymized queries at the proxy server comprises storing the respective anonymized queries in association with each other.

17. The method of claim 15, wherein storing the respective anonymized queries at the proxy server comprises storing the respective anonymized queries for the respective substrings in association with the respective anonymized query for the full string.

18. The method of claim 13, wherein:

the full query is related to personally identifiable information (PII) associated with a user account;

the proxy server and the client device are located in a first geographic region; and the web server is located in a second geographic region.

19. A non-transitory computer-readable storage medium storing one or more programs for execution by one or more processors of a proxy server, the one or more programs including instructions that execute at the proxy server for performing:

receiving, from a client device, a partial query entered at the client device, wherein the partial query includes a first substring of a full query to be generated by an autocomplete suggestion;

generating a first anonymized partial query by replacing the first substring with a first anonymized string, wherein the first anonymized string is correlated with the first substring;

forwarding the first anonymized partial query to a web server;

receiving, from the web server, in response to the first anonymized partial query, a second anonymized query stored by the web server in association with the first anonymized partial query, the second anonymized query corresponding to the autocomplete suggestion;

translating the second anonymized query into a first de-anonymized query, wherein the first de-anonymized query is correlated with the second anonymized query; and sending, to the client device, the autocomplete suggestion including the first de-anonymized query, to generate the full query.

* * * * *